United States Patent [19]

Sund

[11] 4,278,849
[45] Jul. 14, 1981

[54] TEST ARRANGEMENT FOR AUTOMATIC NUMBER IDENTIFICATION SYSTEMS

[75] Inventor: Erling T. Sund, Westerville, Ohio

[73] Assignee: Bell Telephone Laboratories, Incorporated, Murray Hill, N.J.

[21] Appl. No.: 95,798

[22] Filed: Nov. 19, 1979

[51] Int. Cl.³ .................. H04M 15/06; H04Q 3/72
[52] U.S. Cl. .................. 179/175.2 C; 179/18 FH
[58] Field of Search .................. 179/175.2 C, 175.21, 179/175.23, 27 G, 18 C, 18 FH, 20

[56] References Cited

U.S. PATENT DOCUMENTS

| | | | |
|---|---|---|---|
| 2,225,305 | 12/1940 | King | 179/20 |
| 3,400,228 | 9/1968 | Bubber | 179/175.2 C |
| 3,430,000 | 2/1969 | Röhrig | 179/175.2 C |
| 3,851,311 | 11/1974 | Mila | 179/175.2 C |
| 3,967,074 | 6/1976 | Schillo | 179/18 FH |

Primary Examiner—Thomas A. Robinson
Attorney, Agent, or Firm—Charles H. Davis

[57] ABSTRACT

A testing arrangement for automatic number identification apparatus is disclosed in a step-by-step telephone system. The "M" leads which apply identification tones to the sleeves of calling lines are periodically scanned for trouble conditions. If an "M" lead is held busy more than a predetermined interval indicating a fault, the test arrangement interrupts the sleeve to release the line finder and the maintenance personnel are notified. The "M" lead is then available for identifying other lines.

The test arrangement periodically tests itself by simulating faults on all "M" leads.

9 Claims, 7 Drawing Figures

TEST ARRANGEMENT FOR AUTOMATIC NUMBER IDENTIFICATION SYSTEMS

TECHNICAL FIELD

This invention relates to telephone communications systems and, particularly, to arrangements for accumulating billing data for calls in the system. In a more particular aspect, this invention relates to apparatus for detecting and isolating faulty circuitry in the call billing data accumulator facilities of telephone switching systems.

BACKGROUND ART

In common control type switching systems, call billing data functions are often performed by apparatus integral with the call processing equipment. This arrangement is advantageous since the calling line and called line identities and the supervisory states used in establishing the talking connection can also be used to record and time billing entries.

In other types of switching systems, such as the direct progressive step-by-step system, data accumulators are appliqued to the telephone switching system to identify the calling and called lines and to monitor the talking connection to ascertain answer and disconnect times. One example of such a system is disclosed in U.S. Pat. No. 3,967,074 to R. F. Schillo of June 29, 1976.

The Schillo patent discloses a Call Data Accumulator (CDA) which monitors the tip, ring and sleeve conductors between the line finder and first selector in a step-by-step system. The CDA detects an initial seizure by the calling customer, records the called number dialed by the calling customer, and monitors the connection for answer and disconnect supervisory signals in order to time the call. The identity of the calling line is derived by the CDA in cooperation with Automatic Number Identification (ANI) equipment. Typically, the ANI equipment momentarily actuates a sleeve relay to connect a tone over an "M" lead to the sleeve lead of the connection at the line finder. The tone is transmitted back over the sleeve lead to the calling customer line equipment and to a translator which converts the line equipment number to the directory number which is to be billed. Depending on the size of the telephone switching office, the office may be served by one or more CDA billing subsystems.

Due to the multipling of "M" leads and the use of common translators within a CDA subsystem, only one calling line can be identified at a time to avoid billing errors. In the event a fault occurs, such as a "held" sleeve lead relay, the CDA subsystem is incapable of billing other calls which originate from lines served by the same CDA.

DISCLOSURE OF THE INVENTION

The foregoing problem is solved and a technical advance is achieved by an arrangement which monitors leads which are used for identifying the calling line and isolating any faulty leads from the rest of the CDA subsystem to permit the subsystem to continue billing the remaining lines served by the subsystem.

More specifically, and in accordance with the illustrative embodiment of the invention, a plurality of status detectors are provided and each detector includes a plurality of monitor circuits which monitor individual "M" leads serving the sleeve leads of a plurality of line finders. Periodically, a sequence circuit scans the monitors looking for a "held" sleeve relay condition. If this condition is detected, an interrupter relay is actuated in the appropriate monitor to release the "M" lead and the line finder associated with the faulty sleeve relay is made busy.

In accordance with a feature of the invention, a "held" sleeve relay condition is detected by monitoring the "M" lead for a prescribed interval to detect an idle condition during this interval. Since the "M" lead services a plurality of line finders, it might be expected that the "M" lead would be busy continuously during periods of heavy traffic. It has been determined, however, that for any given heavy traffic period, there is generally a short interval during which the "M" lead is idle in the absence of a fault condition. The disclosed arrangement, therefore, is designed to monitor the "M" leads for a predetermined interval to detect this momentary idle state.

In accordance with another feature of the invention, apparatus is provided for periodically testing the arrangement by simulating fault conditions in the system.

GENERAL DESCRIPTION—FIG. 1

Figure 1:
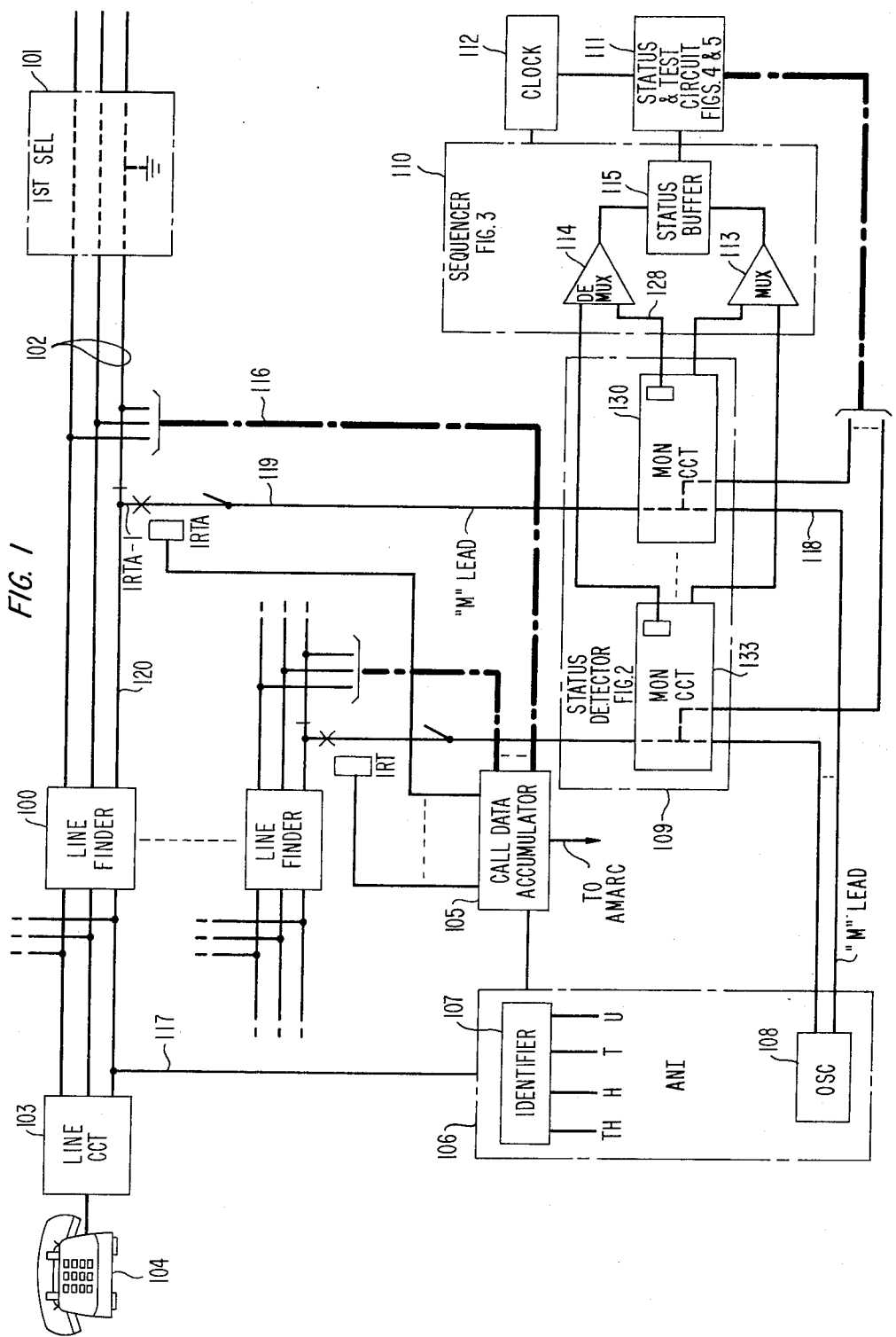
FIG. 1 shows a block diagram of the invention in a typical step-by-step telephone system.

FIG. 1 shows a block diagram of a portion of a typical step-by-step switching system employing the invention. The switching system comprises a plurality of line finders, such as 100, each of which is coupled to a corresponding first selector, such as 101 by tip, ring and sleeve conductors 102. Line finder 100 serves a plurality of line circuits, such as 103.

As is well-known in the art, when the customer at station 104 lifts his receiver to originate a call, line circuit 103 marks a terminal on the contact banks of line finder 100 and line finder 100 is actuated to search for the line requesting service. When the line that went off-hook is found, line finder 100 cuts through the tip, ring and sleeve conductors 102 to the first selector 101 which returns dial tone to the calling customer. The calling customer dials the directory number of the called line and the digits of this number actuate the first selector 101 and subsequent selectors in the switch train to direct the call to the desired destination.

The switching center shown in FIG. 1 is also provided with a plurality of Call Data Accumulators (CDA), such as 105, which are arranged to accumulate call billing data for transmittal to an automatic message accounting recording center (AMARC). Each CDA is coupled by monitor leads 116 to the tip, ring and sleeve conductors 102 of a plurality of line finder/first selector equipments. It is over monitor leads 116 that CDA 105 can monitor the status of calls in the switching system.

For translating the calling line equipment numbers into billing numbers, automatic number identification (ANI) equipment 106 is provided. ANI 106 comprises an identifier 107 which is cross-connected to the sleeve lead of each line equipment location over a conductor such as 117. During the establishment of a call from line circuit 103, oscillator 108 connects tone over "M" leads 118 and 119 to sleeve lead 120. Relay 1RTA is actuated by CDA 105 at this time, and the tone is returned back over conductor 117 to identifier 107. In response to this tone, identifier 107 generates the thousands, hundreds, tens and units digits of the telephone number which is to be billed for the call originated at station 104.

It can be seen from FIG. 1 that when other lines are to be identified, CDA 105 operates other 1RT- relays to connect tone to the sleeve leads of the other line finders serving these calls. With this arrangement, if a sleeve lead relay 1RT- fails to release, CDA 105 is prevented from obtaining the identified number for other calls due to two 1RT- relays being operated simultaneously.

In accordance with the one illustrative embodiment of the invention, the proposed fault detecting and isolating apparatus comprises a plurality of status detectors such as 109, a sequencer 110, a status and test circuit 111, and a clock 112. The apparatus operates autonomously under the control of clock 112 which generates various timing signals to control the sequential operation of status and test circuit 111 and sequencer 110.

Status detector 109 includes a plurality of monitor circuits 130–133 each of which monitors the potential of an "M" lead, such as 118/119, looking for a "no fault" condition. More specifically, a −48 volt potential exists on the "M" lead if any 1RT- relay is actuated and a +5 volt potential appears on the "M" lead if the "M" lead is idle. A fault condition is recognized if the potential on the "M" lead continuously remains at −48 volts for a predetermined interval.

While the fault condition in the disclosed embodiment is recognized by monitoring an "M" lead, it is obvious that in other systems this lead may have a different designation within the spirit and scope of the invention.

Sequencer 110 is arranged to periodically ascertain the conditions of the monitors in each status detector by coupling the monitors through multiplexer 113 to status buffer 115.

In the exemplary embodiment disclosed herein the monitor circuits in each status detector will be scanned approximately once every 260 seconds for an interval of approximately 16 seconds. If the potential on "M" lead 118/119 does not change from −48 volts to +5 volts anytime within the 16 second interval, it is presumed that there is a "held" sleeve relay condition and the faulty line finder associated therewith must be made busy.

Sequencer 110 will actuate an interrupter relay in the status monitor through demultiplexer 114 and when the calling customer using the faulty line finder disconnects, the line finder will be taken out of service.

DETAILED DESCRIPTION

A detailed description will now be given with respect to the invention as disclosed in FIGS. 2–7.

As mentioned above, the system includes a clock designated 112 in the drawing. The circuit details of the clock need not be shown herein for a complete understanding of the invention. Instead, certain of the output pulses of the clock have been shown in the timing diagrams of FIGS. 6 and 7 and it will be obvious to those skilled in the art that many known circuits are available for generating these pulse patterns.

Figure 6:
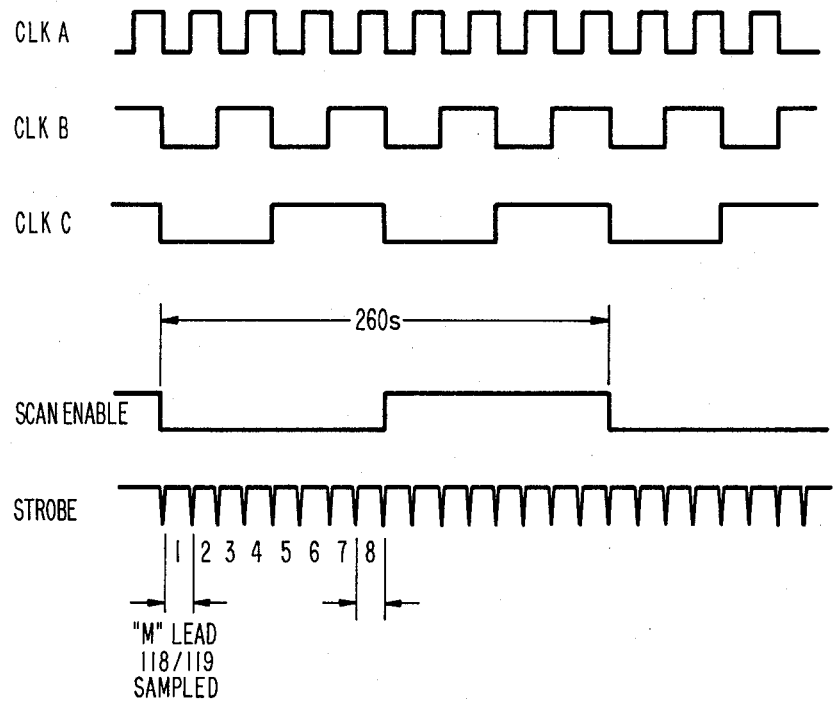
FIG. 6 shows a timing diagram of certain output pulses of the clock circuit used in the invention.

In FIG. 6, the pulses designated CLKA, CLKB, and CLKC are sent over similarly designated leads and form three bit binary words which are used to address the multiplexer and demultiplexers of sequencer 110 to select a particular monitor circuit. The CLKA pulse is nominally 16.38 seconds long and determines the interval an "M" lead is monitored for a "no fault" condition. The SCAN ENABLE pulse on the other hand provides the overall timing for the 260 second scanning cycle of all "M" leads.

Figure 3:
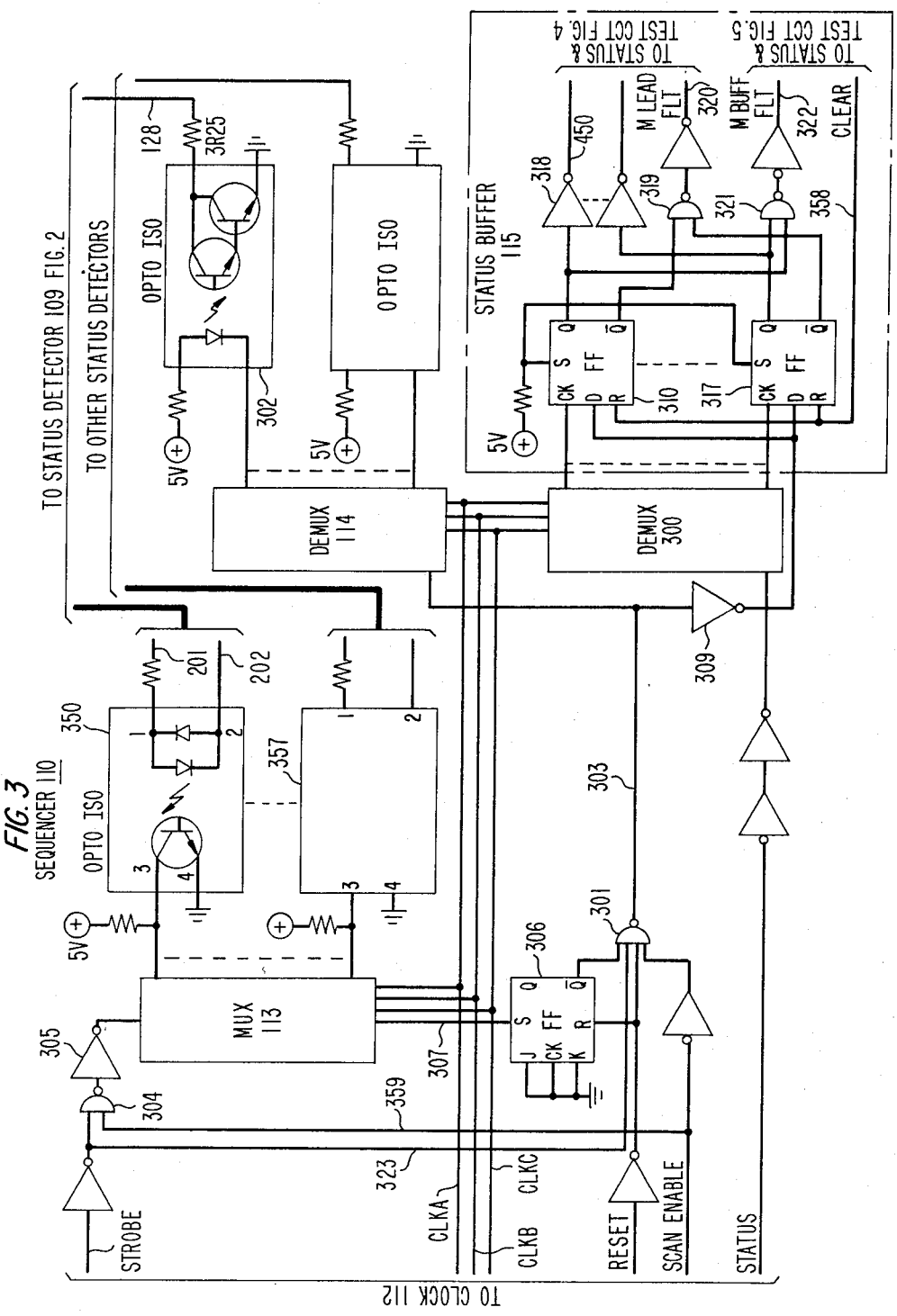
FIG. 3 shows a circuit diagram of the sequencer used in the invention.
Figure 7:
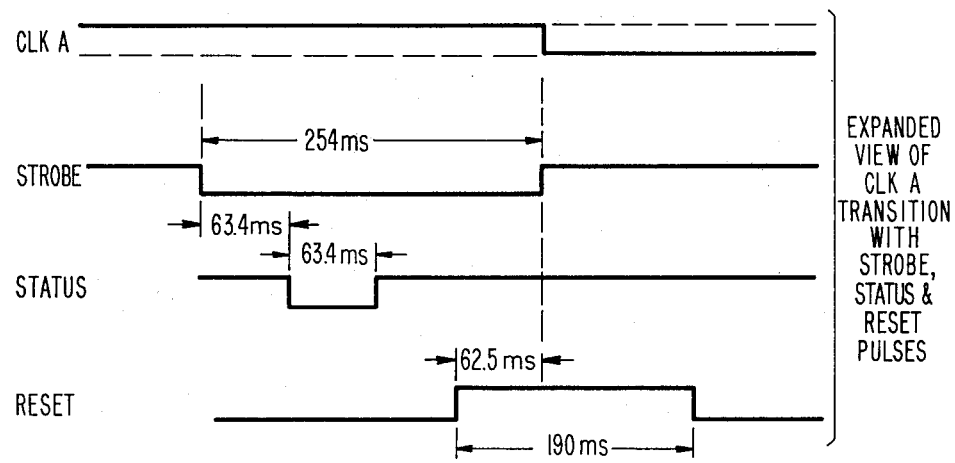
FIG. 7 shows an expanded diagram of other output pulses of the clock circuit.

The RESET pulse, shown in FIG. 7, initiates the sequence for scanning the individual "M" leads by resetting flip-flop 306 in FIG. 3. If a "no fault" condition is detected during the 16.38 second monitoring interval, flip-flop 306 is set.

The STROBE pulse samples the state of flip-flop 306 at the trailing edge of the 16.38 second "M" lead monitoring interval, and the STATUS pulse gates into the appropriate status buffer register (310–317 in FIG. 3) the state of flip-flop 306.

FIG. 7 is an expanded timing diagram and shows the timing of several outputs of clock 112 with respect to the CLKA pulse transition. More specifically, the STROBE pulse is shown expanded as a pulse of approximately 254 milliseconds duration just preceding a CLKA pulse transition in either direction (i.e., positive to negative and vice versa).

The STATUS and RESET pulses are generated prior to any changes in the CLKA pulse and are of 63.4 milliseconds and 190 milliseconds duration, respectively.

A better understanding of the fault detection and isolation apparatus can be had with a description of the overall operation of the system with reference to FIGS. 2–5 of the drawing.

Figure 2:
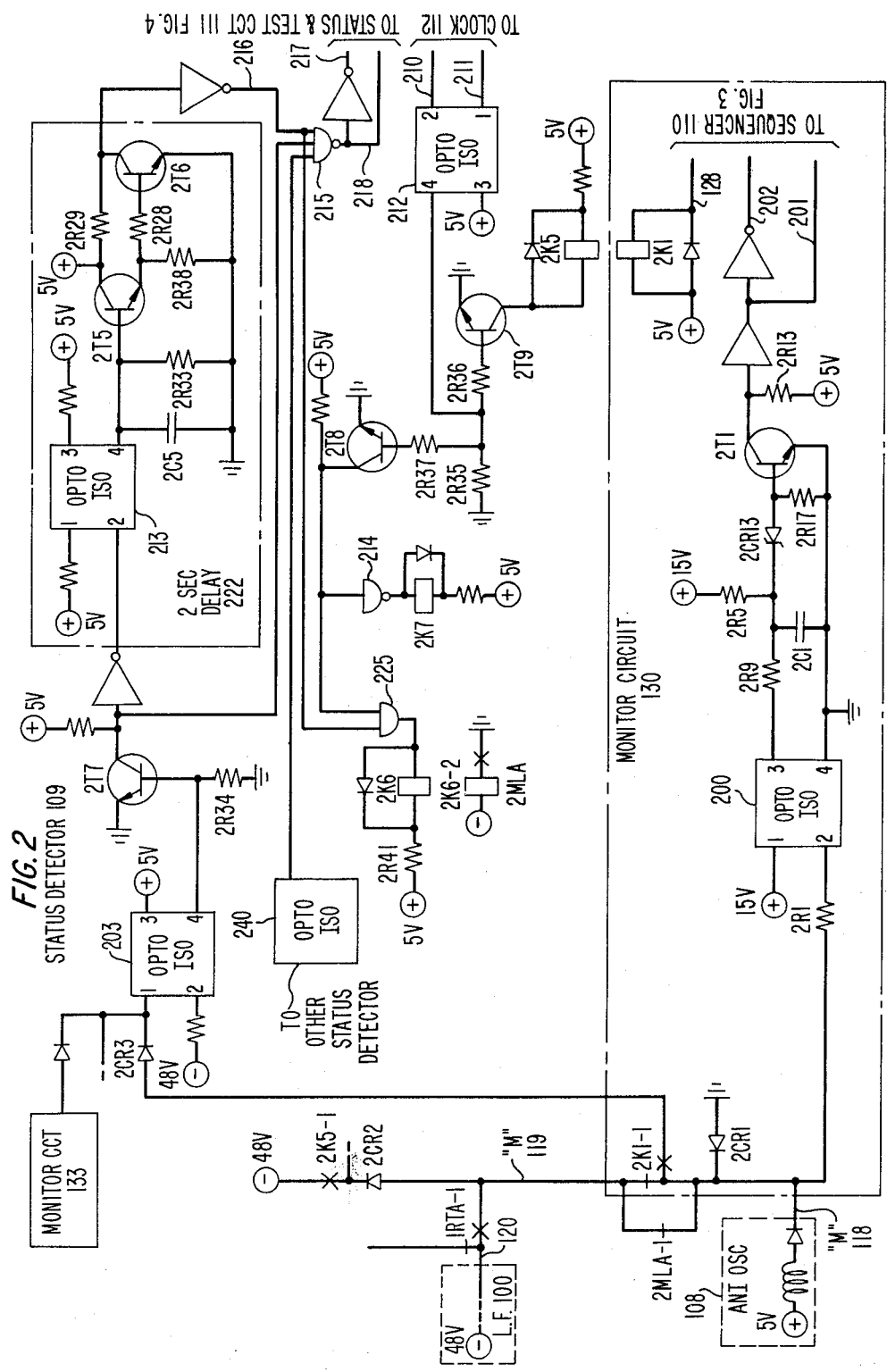
FIG. 2 shows a circuit diagram of a status detector used in the invention.

Each status detector, such as 109 shown in FIG. 2, comprises a plurality of monitor circuits 130 through 133 and circuitry common to the monitor circuits. In the illustrative embodiment each status detector serves four monitor circuits and each monitor circuit monitors an "M" lead, and as shown in FIG. 2, monitor circuit 130 is connected to "M" lead 118/119.

Let is be assumed that "M" lead 118/119 is experiencing a fault in that relay 1RTA at the line finder is held operated closing its contacts 1RTA-1 thereby connecting −48 volts to sleeve lead 120 and "M" lead 119 through break contacts 2K1-1 to optical isolator 200. This causes a voltage change at input 2 to the optical isolator 200 which turns on, causing its output at terminal 3 to go low.

Optical isolators, also known as optical couplers, are well-known in the art and provide coupling between electrical circuits without physical electrical connections. Circuitry for typical optical isolators used in the present invention is shown in FIG. 3 of the drawing.

The low output of optical isolator 200 causes capacitor 2C1 to discharge through resistance 2R9. When the voltage across capacitor 2C1 reaches a level defined by the ZENER voltage 2CR13 and the voltage across the base-emitter junction of 2T1, almost not current will flow through ZENER diode 2CR13 turning off transistor 2T1. With transistor 2T1 off, conductor 201 goes high and conductor 202 goes low. Conductors 201 and 202 will signal sequencer 110 in FIG. 3 of the faulty "M" lead when monitor circuit 130 is scanned by the sequencer.

The sequencer shown in FIG. 3 comprises a multiplexer 113 which has 8 inputs. Each input is responsive to an "M" lead monitor circuit and is coupled to the monitor circuit via optical isolators 350–357. For example, optical isolator 350 couples one input of multiplexer 113 with the monitor circuit 130 shown in FIG. 2. Since the sequencer is designed to function with 8 monitor circuits in this embodiment, each sequencer will cooperate with two status detectors such as the status detector 109 shown in FIG. 2.

Sequencer 110 also comprises the demultiplexers 114 and 300. When actuated, demultiplexer 114 operates an interrupter relay 2K1 in the monitor circuit to release a "held" sleeve lead as will be described below. Demultiplexer 300, on the other hand, provides an indication of the faulty "M" lead to maintenance personnel via status buffer 115 and the status and test circuit shown in FIGS. 4 and 5.

As shown in the timing diagram of FIG. 6, prior to scanning, the SCAN ENABLE output from the clock is high. A high on the SCAN ENABLE lead in FIG. 3 disables gate 301 causing conductor 303 to go high thereby disabling demultiplexer 114. With the demultiplexer 114 disabled all of its outputs remain high.

The high on the SCAN ENABLE lead also disables gate 304 causing its output to go low and the low output of gate 304 is inverted by inverter 305 to disable multiplexer 113 forcing the output on conductor 307 of the multiplexer to go high. Multiplexer 113 will be enabled only in the presence of a low on the SCAN ENABLE lead and a high on the STROBE lead.

Clock leads CLKA, CLKB, and CLKC are coupled to each demultiplexer and to the multiplexer in FIG. 3. The binary signals on these leads determine which input of multiplexer 113 is enabled and which output of demultiplexers 114 and 300 are enabled. For purposes of this description let it be assumed that all three CLK- leads are at binary 0 which corresponds to a high on each lead. Under this assumption, the original isolators 350 and 302 and flip-flop 310 will be addressed.

The SCAN ENABLE output of the clock goes low once every 260 seconds which times the frequency of a complete scanning cycle of all "M" leads. Thus, when the SCAN ENABLE goes low, gates 301 and 304 will be partially enabled. Approximately 62.5 milliseconds prior to the change of state on the CLKA lead the RESET output from the clock will go high resetting status monitor flip-flop 306 and disabling gate 301 in the sequencer of FIG. 3. The reset pulse will remain high for about 190 milliseconds to eliminate any transient clock states which may occur during a change of state of the CLKA, CLKB and CLKC signals.

The output of the STROBE lead from the clock is a negative going pulse which occurs just prior to every change of state on the CLK- leads. The leading edge of this pulse occurs approximately 254 milliseconds prior to a CLK- pulse transition as shown in the timing diagram of FIG. 7.

With the STROBE lead high and the SCAN ENABLE lead low, multiplexer 113 will be enabled via gate 304 and the binary 0 state of CLKA, CLKB, and CKLC leads will cause optical isolator 350 to be sampled.

It will be recalled that the conductors 201 and 202 were high and low, respectively indicating a "held" sleeve relay condition for the monitor circuit 250 shown in FIG. 2. With these signals on the input of optical isolator 350, output terminal 3 goes low, and since multiplexer 113 is sampling isolator 350, the output conductor 307 of the multiplexer will go high. If conductor 201 were low and 202 were high indicating the absence of −48 volts on "M" lead 118/119, output 307 of multiplexer 113 would be low and flip-flop 306 would be set. This latter condition corresponds to a "no fault" condition on the corresponding "M" lead.

It can be seen from the timing diagram in FIG. 6 that the CLK- leads change state every 16.38 seconds. This effectively causes multiplexer 113 and flip-flop 306 in FIG. 3 to monitor an "M" lead monitor circuit of FIG. 2 for a period of 16.38 seconds searching for a faulty "held" sleeve relay. If the "M" lead being monitored goes idle at any time during these 16.38 seconds for an interval exceeding 500 microseconds, status monitor flip-flop 306 will be set indicating that the "M" lead being monitored is not faulty.

If flip-flop 306 is not set during the 16.38 second scan thereby indicating a faulty "M" lead, the $\bar{Q}$ output will be high partially enabling gate 301. Approximately 254 milliseconds prior to a change of state of the CLK- signals the STROBE lead goes low fully enabling gate 301 over conductor 323 if status monitor flip-flop 306 had not been set during the 16.38 monitor interval.

When gate 301 is enabled, its low output over conductor 303 enables demultiplexer 114 and with the CLKA, CLKB, and CLKC signals still low as has been assumed, demultiplexer 114 will turn on optical isolator 302.

With isolator 302 turned on, ground is connected through resistance 3R25 to the status detector 109 over conductor 128 to FIG. 2 to operate interruptor relay 2K1 in monitor circuit 130. Relay 2K1 actuates its contacts 2K1-1 in FIG. 2 to interrupt "M" lead 118/119. When the "M" lead is interrupted, ground from the ANI circuit 108 is removed from the sleeve and the line finder releases.

The output of gate 301 in FIG. 3 is also connected to the D inputs of flip-flop buffer registers 310 through 317 via inverter 309. Demultiplexer 300 is clocked by a signal on the STATUS conductor and its output is determined by the binary states of the CLKA, CLKB, and CLKC inputs which in the example being described will steer the output of the multiplexer 300 to flip-flop 310.

The output pulse of demultiplexer 300 is coupled to the clock input of flip-flop 310 and the low output of gate 301, as inverted by the inverter 309, is coupled to the D input of flip-flop 310 causing the Q output to go high during the negative transitions of the STATUS pulse. The Q output is inverted by inverter 318 and transmitted over conductor 450 to energize LED 451 in the status and test circuit 111 shown on FIG. 4. The other side of LED 451 is connected over conductor 460 to positive potential via transistor 5T5. Transistors 5T5 and 5T6 are turned on at this time as will be described below. Transistor 5T6 drives the LEDs in "M" lead status display 456 which can function with another sequencer if the system is so equipped.

To prevent the status buffers from being erroneously cleared, the clock circuit allows the STATUS pulse to be present only when the SCAN ENABLE signal is low. The leading edge of the STATUS pulse occurs approximately 63.4 milliseconds after the STROBE pulse and has a pulse width of approximately 63.4 milliseconds as shown in FIG. 7.

Figure 4:
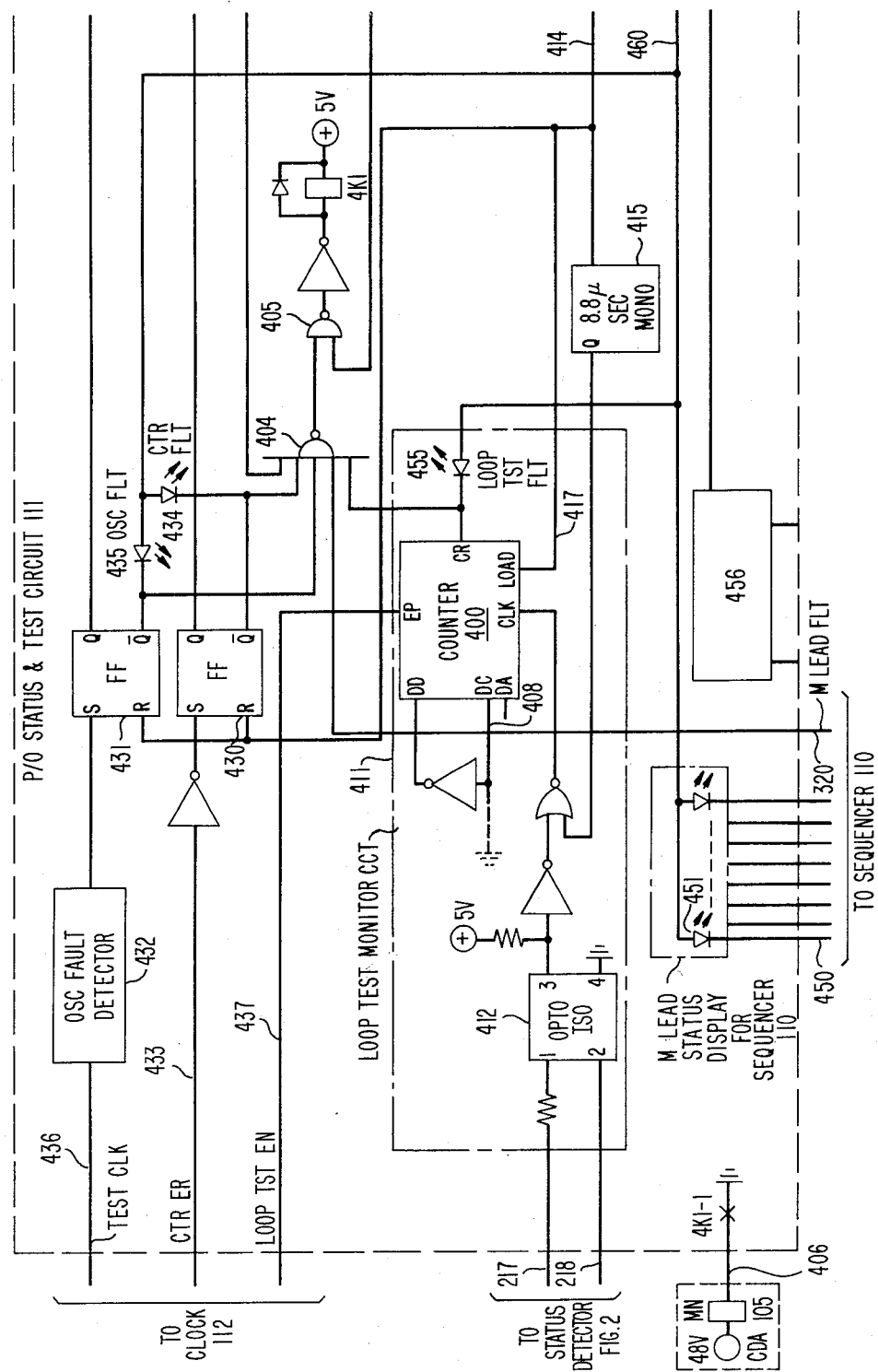
FIGS. 4 and 5 with FIG. 4 arranged to the left of FIG. 5 shows the status and test circuit of the invention.

The $\bar{Q}$ outputs of all flip-flops 310–317 are coupled to OR gate 319, and if any $\bar{Q}$ output goes low, a low signal will be transmitted over conductor 320 to status and test circuit 111 in FIG. 4 indicating an "M" lead fault.

In FIG. 4 gate 404 acts as an OR gate for all "M" lead faults, oscillator faults, counter faults, and test failure faults. Any input, such as conductor 320 going low, causes gate 404 to put out a high signal enabling gate 405 whose output goes low to operate relay 4K1. Relay 4K1 transmits a ground over conductor 406 to inform the alarm reporting center of the switching system of a "held" sleeve relay detector fault.

In FIG. 3, the remaining optical isolators 351–357 are sequentially scanned as multiplexer 113 in the sequencer 110 is advanced through each state by the binary signals on conductors CLKA, CLKB and CLKC.

Approximately once every 65 minutes a test is performed to verify that all "M" lead monitors are functioning properly. To verify proper operation of the "M" lead status buffer registers, all flip-flops 310–317 are cleared just prior to and immediately after the test cycle by a clear signal on conductor 358 from FIG. 5 of the status and test circuitry.

At the end of the test which simulates a faulty "M" lead associated with each of flip-flops 310–317, all of these flip-flops should be set. The Q output of any flip-flop not set during the test will enable OR gate 321 and a low will be sent over conductor 322 to the status and test circuitry of FIG. 5 indicating an internal fault in the test arrangement.

Loop Test Sequence

As mentioned above, the disclosed arrangement is designed to perform a self testing check sequence periodically. During the test sequence, referred to as a "loop test," a simulated fault is applied to each "M" lead and the interrupter relays associated with the "M" leads are pulsed similar to the action taken when an actual fault is encountered. As the relays in the monitor circuits are pulsed, signals are returned to the status and test circuit for each monitor circuit. These signals are counted by a loop test monitor circuit to ascertain if all interrupter relays were pulsed.

Figure 5:
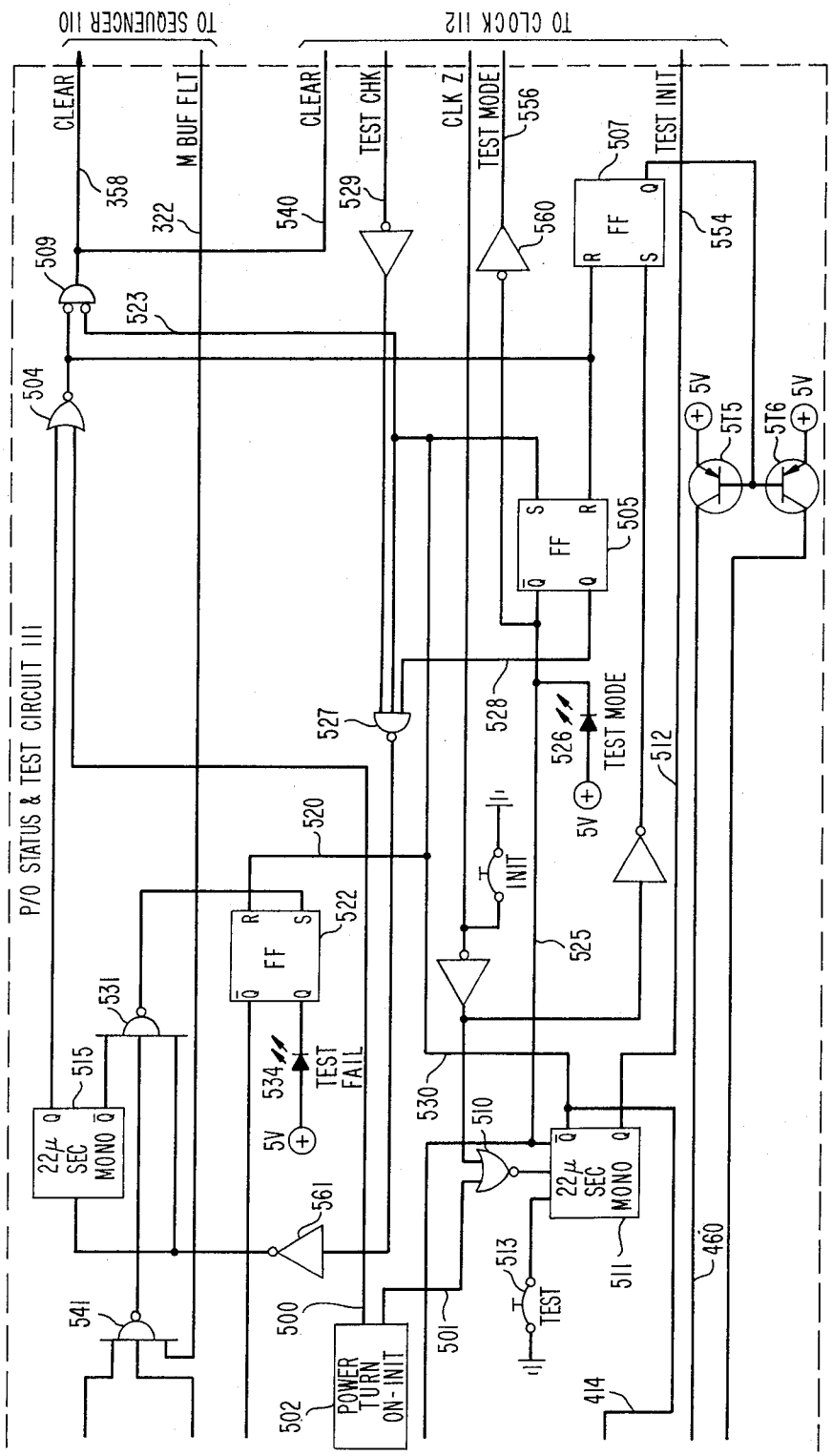

The test sequence can be initiated manually by the actuation of test key 513 or the INIT key in FIG. 5. However, the sequence is also initiated by a pulse on conductor CLKZ which occurs about once every 65 minutes. The negative going pulse on conductor CLKZ is ORed by OR gate 510 to trigger monopulser 511 and thus start the test sequence.

Monopulser 511 is also triggered by initiator circuit 502 when power is first applied to the circuitry. During power turn on, circuit 502 applies a high level signal on lead 500 until an internal RC circuit times out. A high level signal on lead 500 causes the output of OR gate 504 to go low holding flip-flops 505 and 507 reset. The output of OR gate 504 is applied to OR gate 509 to clear the sequencer 110 in FIG. 3 and clock circuit 112. When the signal on lead 500 goes low, a short, less than one microsecond, positive going pulse is applied on lead 501. The short positive signal on lead 501 triggers monopulser 511 similar to a negative going pulse on CLKZ.

Monopulser 511 and flip-flop 505 form the control logic for performing the loop test sequence. The output pulse from monopulser 511 is nominally 22 microseconds long. The leading edge of the $\overline{Q}$ pulse triggers monopulser 415 in FIG. 4 over conductor 414 and enables the load input of counter 400 over conductors 414 and 417. The signal on conductor 414 is extended over conductor 409 in FIG. 4 to reset flip-flops 430 and 431. The $\overline{Q}$ output of monopulser 511 also sets flip-flop 505 over conductor 530, and also resets flip-flop 522 over conductors 530 and 520. The test initiator conductor 554 and the clear conductor 540 to the clock and the clear conductor 358 to the sequencer will also go high for the duration of the pulse from monopulser 511, the signal on the clear conductors 540 and 358 resulting from the enablement of OR gate 509.

When flip-flop 507 is set, transistors 5T5 and 5T6 are turned off and the fault indicator LEDs, such as 451, are disabled to prevent them from being energized during the automatic loop test. When the loop test is initiated using the TEST key 513, flip-flop 507 is not set and allows maintenance personnel to monitor the display LEDs.

When flip-flop 505 is set by monopulser 511, the $\overline{Q}$ output of flip-flop 505 goes low inhibiting monopulser 511 over conductor 525, and flip-flop 505 also sends a high signal via inverter 560 over test mode conductor 556 to the clock circuit. Flip-flop 505 energizes test mode LED 526 and partially enables gate 527 over conductor 528 from its Q output.

Upon receiving high signals on conductors 556 and 554, clock 112 returns a high and low signal on test enable conductors 210 and 211, respectively, to optical isolator 212 in status detector 109 as shown in FIG. 2. This conditions the status detector for a loop test. As each status detector is addressed, the simulated fault condition in each status detector will be counted by counter 400; however, counter 400 will not be fully enabled until a signal is received from clock 112 over loop test enable conductor 437. This signal occurs 63 milliseconds later to allow any "M" lead interrupter relays to release before the loop test monitor circuit 411 is enabled.

In FIG. 2, optical isolator 212 is energized by the high and low signals on conductors 210 and 211 turning on transistor 2T9 and operating relay 2K5. Relay 2K5 connects −48 volts through its contacts 2K5-1 and diode 2CR2 to "M" lead 119 simulating a "held" sleeve condition.

Relay 2K6 is released at this time to release relay 2MLA, and in releasing, relay 2MLA will short circuit all "M" leads to bypass the monitor circuits and prevent the loop test from causing any ANI failures. Relay 2K7 is also released to open a circuit (not shown) for preventing an alarm from sounding when the "M" lead interrupt relay is pulsed during the loop test sequence.

With the simulated fault condition connected to the "M" lead via contacts 2K5-1, optical isolator 200 will turn on transistor 2T1 in monitor circuit 130 and signal sequencer 110 as described above. Sequencer 110 when addressing monitor circuit 130 will recognize this fault and pulse interrupter relay 2K1 in the monitor circuit to interrupt the "M" lead for approximately 12 milliseconds. The current flow from optical isolator 203 through diode 2CR3, and contacts 2K1-1 to ground at diode 2CR1 enables optical isolator 203 which turns on transistor 2T7 causing its collector to go low. Optical isolator 203 acts as an OR gate in that it will detect the operation of any of the interrupt relays such as 2K1 in each of the four monitor circuits 130–133.

Circuit 222, including optical isolator 213, transistors 2T5 and 2T6, and other circuit components, forms a delay circuit to detect the presence of a permanently operated relay 2K1. If any of the 2K1 relays remain operated for two seconds or longer, the collector of transistor 2T6 will go high inhibiting AND gates 214 and 215.

During the normal loop test sequence, if the relays, such as 2K1, are functioning properly, the relays are not operated for sufficient time to trigger the two second delay circuit 22. With gate 215 enabled, high and low signals are transmitted over loop test conductors 217 and 218 to loop test monitor circuit 411 in the status and test circuit of FIG. 4. The signals on conductors 217 and 218 enable optical isolator 412 and advance counter 400 in the loop test monitor circuit. The counter is advanced once for each monitor circuit. Thus, the four monitor circuits served by status detector 109 in FIG. 2 will each provide a pulse and the four monitor circuits served by the other status detector (not shown) will provide four pulses via optical isolator 240 and gate 215 to the status and test circuit of FIG. 4.

When monopulser 511 was initially triggered at the start of the loop test sequence, its output triggered monopulser 415 for 8.8 microseconds coincidentally with the output pulse from monopulser 511. As mentioned above, the negative going pulse on conductors 414 and 417 enabled the load input of counter 400 and when the load input is low, the DA through DD inputs are loaded into the counter.

The state of the DC and DD signal leads is determined by the potential on the conductor 408. Thus, if conductor 408 is grounded four pulses will be required on the loop test signal leads to cause the CR output of the counter to go high. On the other hand, if conductor 408 is left open, eight pulses are required to cause the CR output to go high. In this case, it has been assumed that eight monitor circuits have been provided and conductor 408 is not connected to ground. When the proper number of pulses are received, the CR output of counter 400 goes high. In the event that an incorrect number of pulses are received output CR of counter 400 will be low and the loop test fault LED 455 will be energized indicating a loop test failure.

Clock 112, which has not been shown in detail, includes a master counter and a slave counter which is syncronized with the master counter. As long as both counters are syncronized, a low will be present on conductor 433 to the status and test circuit of FIG. 4. If conductor 433 goes high indicating that the counters have lost syncronization, flip-flop 430 will be set energizing counter fault LEd 434.

Status and test circuit 111 is also provided with an oscillator fault detector circuit 432 which monitors the frequency on conductor 436 from clock 112. As long as the frequency is between 4 hertz and 70 hertz, flip-flop 431 will not be set. If the frequency drifts beyond these limits, flip-flop 431 will be set to energize oscillator fault LEd 435.

Of course, it is to be understood that the arrangement described in the foregoing are merely illustrative of the application of the principles of the present invention and numerous other arrangements may be utilized by those skilled in the art without departing from the spirit and scope of the invention.

I claim:

1. For use in an automatic number identification system wherein an identifying signal is intermittently applied to a conductor common to a plurality of customer line switches to identify during each application an individual line presently connected to one of said switches and wherein means are provided for removing defective switches from service
  CHARACTERIZED BY
    means for continuously monitoring the potential on said conductor for a predetermined interval and
    means actuated by said monitoring means when said potential is on said conductor continuously during said interval for interrupting the continuity of said conductor to permit said switch associated therewith to release.

2. For use in a telephone system comprising groups of line switches, automatic number identification means including an individual conductor associated with each switch group, and means for momentarily connecting each conductor with a switch in its corresponding switch group to transmit an identifying signal over said conductor to identify a line connected to said switch
  CHARACTERIZED BY
    apparatus for detecting trouble-held ones of said connecting means comprising a plurality of monitor means each coupled to a corresponding one of said identifying conductors and responsive to said identifying signal thereon,
    means for periodically scanning each said monitor means for a predetermined interval, and
    means controlled by said scanning means for interrupting the signal on said conductor when said signal is continuously present for said predetermined interval.

3. The invention set forth in claim 2 wherein said apparatus further includes test means for periodically simulating a faulty connecting means associated with each said signaling conductor.

4. The invention set forth in claim 2 wherein each said monitor means includes a device enabled in the presence of said identifying signal on said corresponding conductor, and wherein said scanning means comprises a multiplexer having an input port associated with each said device, a status circuit, and means for sequentially coupling each said input port to said status circuit for said predetermined interval.

5. The invention set forth in claim 4 wherein said interrupting means comprises a plurality of switches each associated with a corresponding one of said monitor means and wherein said scanning means further comprises a demultiplexer having an output port associated with each said switch and said coupling means comprises means for sequentially connecting said status circuit to each said output port.

6. The invention set forth in claim 5 wherein said apparatus also comprises means for indicating the identification of each said trouble-held connecting means.

7. The invention set forth in claim 2 wherein said apparatus further comprises
    test means for periodically connecting a fault potential to a designated number of said conductors to simulate a trouble-held connecting means associated therewith,
    means responsive to said interrupting means for generating an output signal for each conductor to which said fault potential is applied, and
    means for verifying that the number of output signals equals said designated number of conductors.

8. The invention set forth in claim 7 wherein said verifying means comprises a counter responsive to said output signals and means for presetting said counter to said designated number.

9. The invention set forth in claim 8 wherein said interrupting means comprises a bistable device actuated by said scanning means for a preselected interval and
    wherein said generating means comprises circuit means enabled when any said device is actuated longer than said preselected interval for generating a second output signal.

* * * * *